(12) United States Patent
Schaefer et al.

(10) Patent No.: US 9,861,025 B2
(45) Date of Patent: Jan. 9, 2018

(54) SEED PLANTING APPARATUS, SYSTEMS AND METHODS

(71) Applicant: Precision Planting LLC, Tremont, IL (US)

(72) Inventors: Tim Schaefer, Tremont, IL (US); Ian Radtke, Washington, IL (US)

(73) Assignee: Precision Planting LLC, Tremont, IL (US)

(*) Notice: Subject to any disclaimer, the term of this patent is extended or adjusted under 35 U.S.C. 154(b) by 0 days.

(21) Appl. No.: 15/593,950

(22) Filed: May 12, 2017

(65) Prior Publication Data

US 2017/0245420 A1    Aug. 31, 2017

Related U.S. Application Data

(63) Continuation of application No. PCT/US2015/060485, filed on Nov. 12, 2015.

(60) Provisional application No. 62/078,778, filed on Nov. 12, 2014.

(51) Int. Cl.
*A01C 5/06* (2006.01)
*A01C 7/04* (2006.01)
*A01B 79/00* (2006.01)

(52) U.S. Cl.
CPC ............ *A01B 79/005* (2013.01); *A01C 5/064* (2013.01); *A01C 7/046* (2013.01)

(58) Field of Classification Search
CPC ........... A01C 5/064; A01C 5/062; A01C 5/06; A01C 5/00; A01C 7/046; A01C 7/044; A01C 7/042; A01C 7/04; A01C 7/00; A01B 79/005; A01B 79/00
See application file for complete search history.

(56) References Cited

U.S. PATENT DOCUMENTS

| | | | |
|---|---|---|---|
| 7,334,532 B2* | 2/2008 | Sauder | A01C 7/046 111/185 |
| 2013/0192504 A1* | 8/2013 | Sauder | A01C 7/046 111/184 |
| 2014/0230705 A1* | 8/2014 | Radtke | A01C 7/046 111/177 |

* cited by examiner

*Primary Examiner* — Christopher J. Novosad
(74) *Attorney, Agent, or Firm* — Thomas J. Oppold; Larkin Hoffman Daly & Lindgren, Ltd.

(57) ABSTRACT

A seed meter includes a seed disc rotatable in a direction of rotation. The seed disc has a plurality of seed apertures defining a circular path as the seed disc rotates and on which seeds from a seed source are entrained. A singulator is disposed along to the circular path. The singulator has a plurality of outer lobes and a first orientation lobe located downstream of the outer lobes. As the entrained seeds rotate along the circular path, the first orientation lobe contacts the entrained seeds to change their orientation. In some embodiments, the first orientation lobe may be disposed to remove excess seeds from the apertures and a second orientation lobe may change the orientation of the entrained seed.

20 Claims, 15 Drawing Sheets

SEED PLANTING APPARATUS, SYSTEMS AND METHODS

CROSS-REFERENCE TO RELATED APPLICATIONS

This application is a continuation of PCT Application No. PCT/US2015/060485 filed Nov. 12, 2015, which claims the benefit of U.S. Provisional Application No. 62/078,778, filed Nov. 12, 2014.

DESCRIPTION

Figure 1:
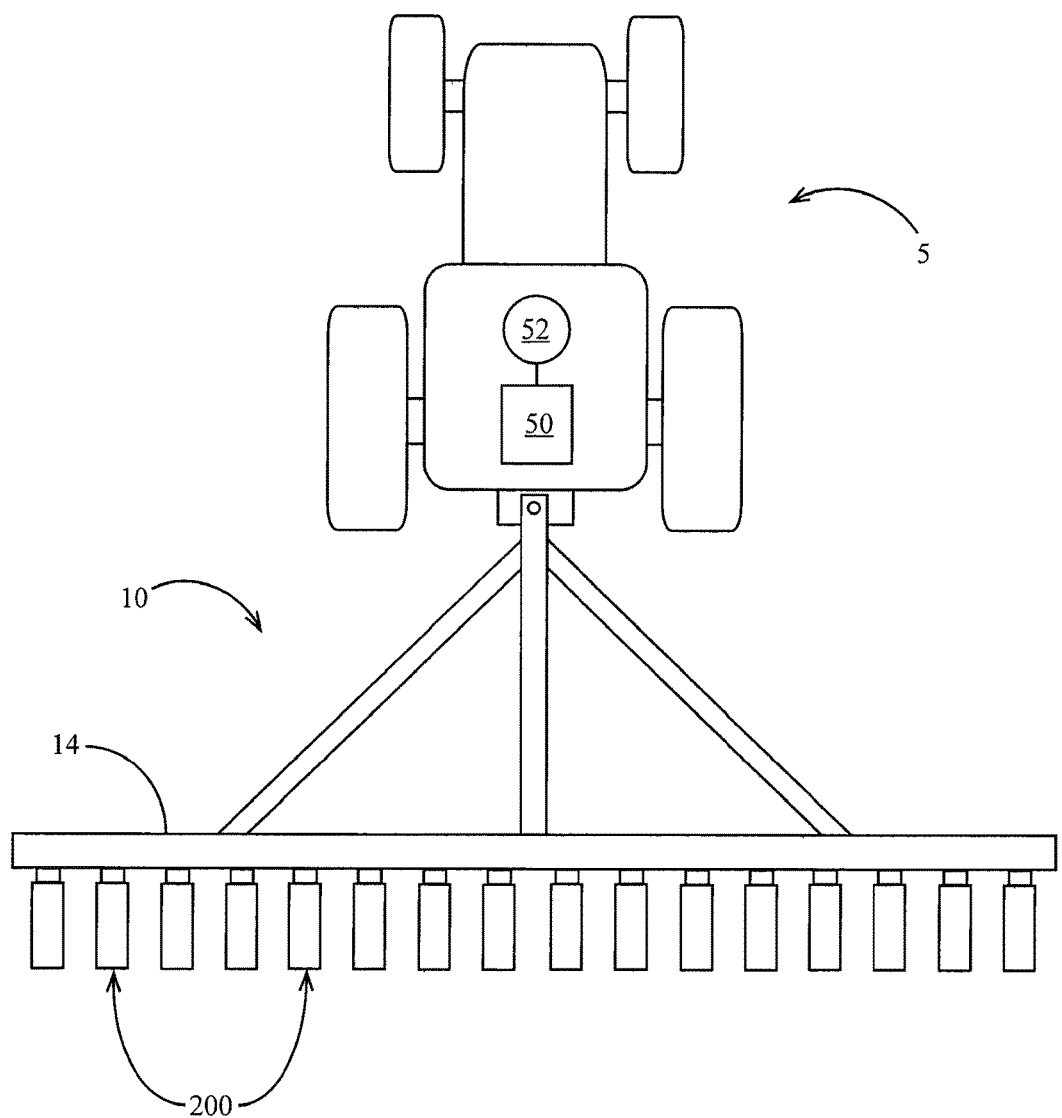
FIG. 1 is a top view of an embodiment of an agricultural planter.

Referring now to the drawings, wherein like reference numerals designate identical or corresponding parts throughout the several views, FIG. 1 illustrates a tractor 5 drawing an agricultural implement, e.g., a planter 10, comprising a toolbar 14 operatively supporting multiple row units 200. An implement monitor 50 preferably including a central processing unit ("CPU"), memory and graphical user interface ("GUI") (e.g., a touch-screen interface) is preferably located in the cab of the tractor 5. A global positioning system ("GPS") receiver 52 is preferably mounted to the tractor 5.

Figure 2:
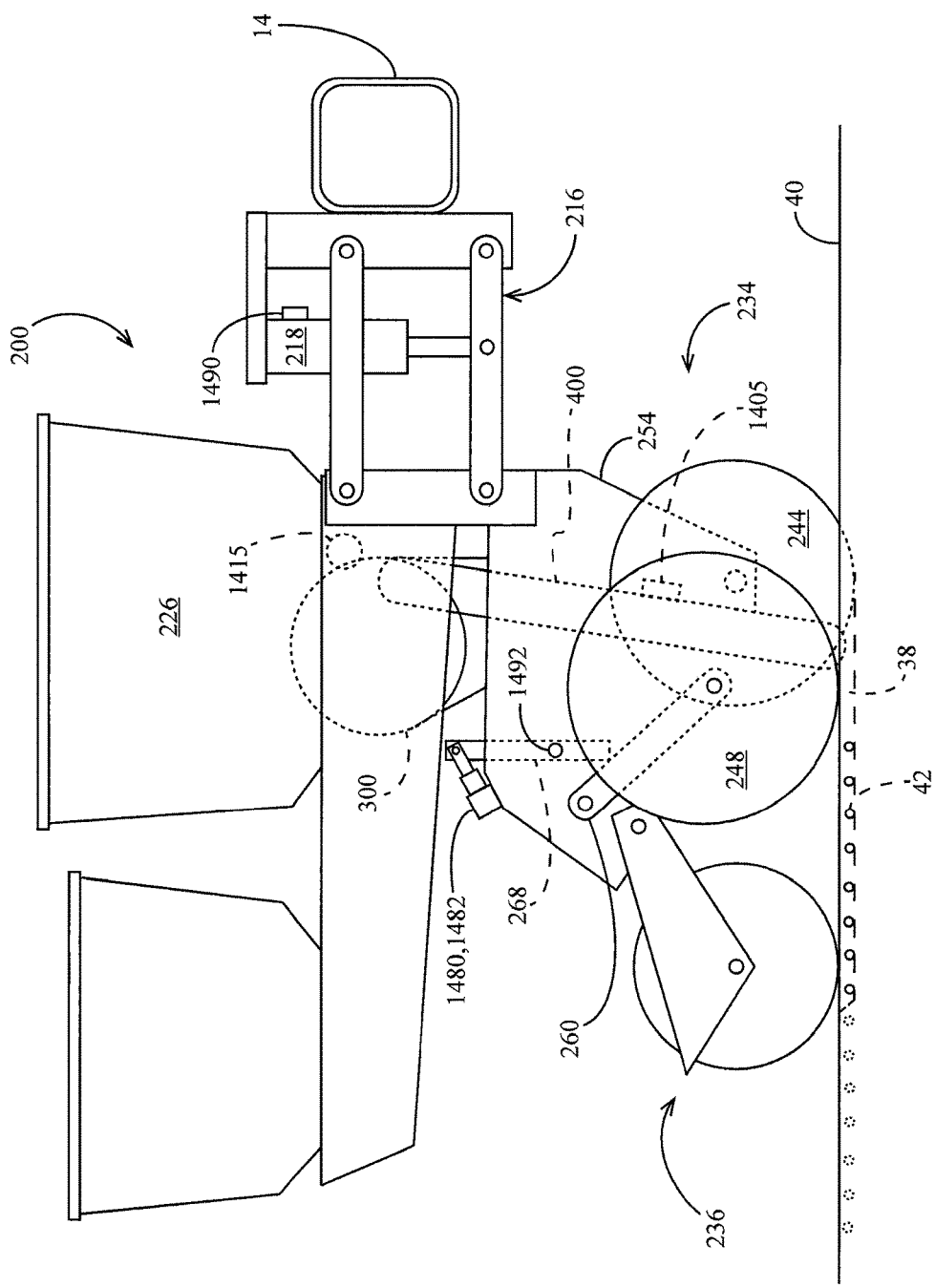
FIG. 2 is a side elevation view of an embodiment of a planter row unit.

Turing to FIG. 2, an embodiment is illustrated in which the row unit 200 is a planter row unit. The row unit 200 is preferably pivotally connected to the toolbar 14 by a parallel linkage 216. An actuator 218 is preferably disposed to apply lift and/or downforce on the row unit 200. A downforce control valve 1490 (e.g., a pressure control valve such as a pressure reducing/relieving valve) is preferably in fluid communication with the actuator 218 for modifying the lift and/or downforce applied by the actuator 218. An opening system 234 preferably includes two opening discs 244 rollingly mounted to a downwardly-extending shank 254 and disposed to open a v-shaped trench 38 in the soil 40. A pair of gauge wheels 248 is pivotally supported by a pair of corresponding gauge wheel arms 260; the height of the gauge wheels 248 relative to the opener discs 244 sets the depth of the trench 38. A depth adjustment rocker 268 limits the upward travel of the gauge wheel arms 260 and thus the upward travel of the gauge wheels 248. A depth adjustment actuator 1480 is preferably configured to modify a position of the depth adjustment rocker 268 and thus the height of the gauge wheels 248. The actuator 1480 is preferably a linear actuator mounted to the row unit 200 and pivotally coupled to an upper end of the rocker 268. In some embodiments the depth adjustment actuator 1480 comprises a device such as that disclosed in International Patent Application No. PCT/US2012/035585 ("the '585 application"), the disclosure of which is hereby incorporated herein by reference. An encoder 1482 is preferably configured to generate a signal related to the linear extension of the actuator 380; it should be appreciated that the linear extension of the actuator 1480 is related to the depth of the trench 38 when the gauge wheel arms 260 are in contact with the rocker 268. A downforce sensor 1492 is preferably configured to generate a signal related to the amount of force imposed by the gauge wheels 248 on the soil 40; in some embodiments the downforce sensor 1492 comprises an instrumented pin about which the rocker 268 is pivotally coupled to the row unit 200, such as those instrumented pins disclosed in Applicant's U.S. patent application Ser. No. 12/522,253 (Pub. No. US 2010/0180695), the disclosure of which is hereby incorporated herein by reference.

Continuing to refer to FIG. 2, a seed meter 300 is preferably disposed to deposit seeds 42 from a hopper 226 into the trench 38. The seed meter 300 is preferably a vacuum-type seed meter having common operating principles with the seed meter embodiments as disclosed in International Patent Application No. PCT/US2012/030192, the disclosure of which is hereby incorporated herein by reference. Although in some embodiments the seed meter may deposit seeds into the trench 38 directly or via a seed tube, the seed meter 300 preferably meters seeds into a seed conveyor 400; the seed conveyor is preferably configured to convey seeds from the seed meter to the trench at a controlled rate of speed as disclosed in U.S. patent application Ser. No. 14/347,902 and/or U.S. Pat. No. 8,789,482, both of which are incorporated by reference herein. In some embodiments, the seed meter 300 is powered by a meter drive 1415 configured to drive a seed disc within the seed meter. In other embodiments, the drive 1415 may comprise a hydraulic drive configured to drive the seed disc. A seed sensor 1405 (e.g., an optical or electromagnetic seed sensor configured to generate a signal indicating passage of a seed) is preferably mounted to the seed tube 232 and disposed to send light or electromagnetic waves across the path of seeds 42. A closing system 236 including one or more closing wheels is pivotally coupled to the row unit 200 and configured to close the trench 38.

Figure 14:
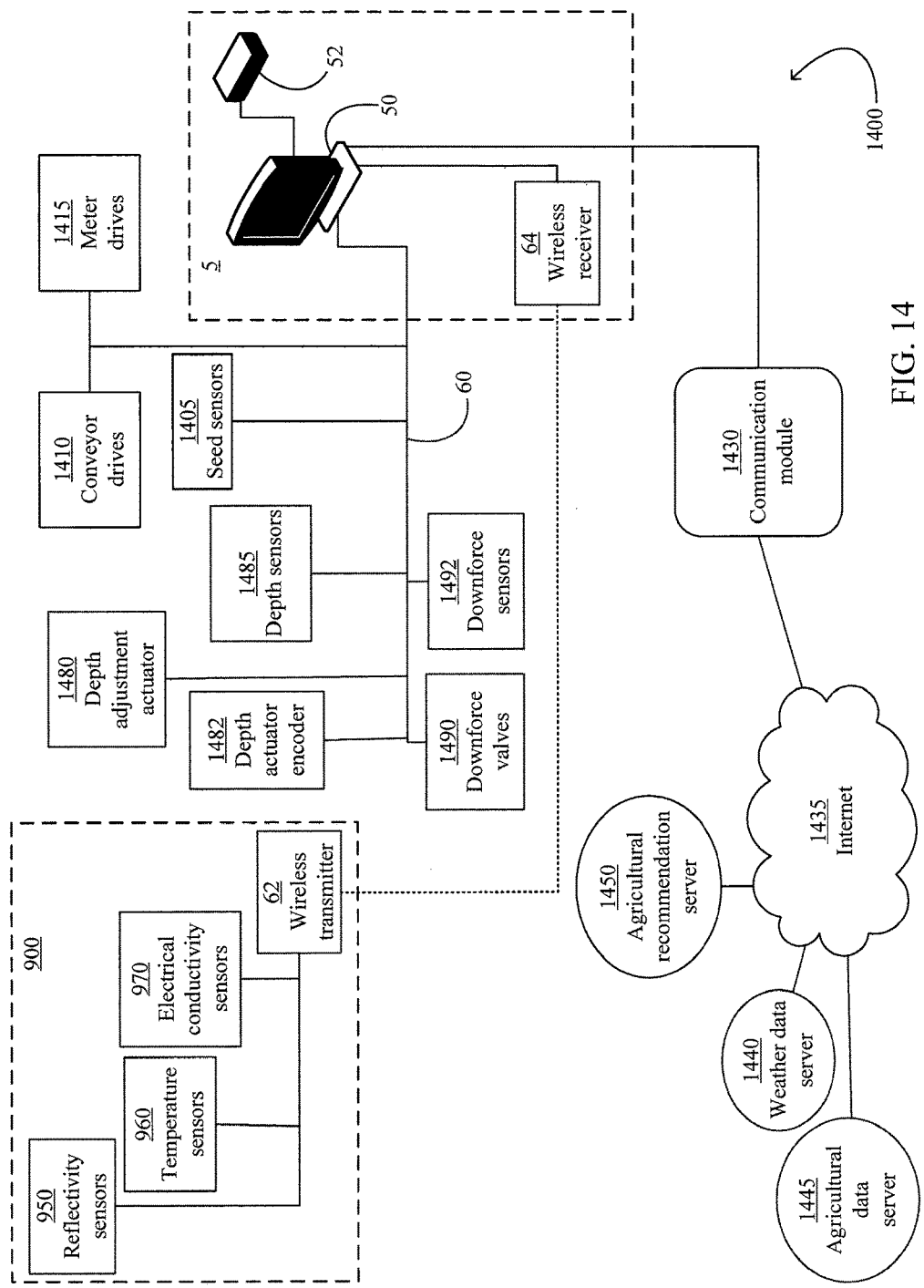
FIG. 14 illustrates an embodiment of a monitoring and control system.

Turning to FIG. 14, a planter control and soil monitoring system 1400 is schematically illustrated. The monitor 50 is preferably in data communication with components associated with each row unit 200 including the drives 1415, the seed sensors 1405, the GPS receiver 52, the downforce sensors 1492, the valves 1490, the depth adjustment actuators 1480, depth actuator encoders 1482, and depth sensors 1485 configured to measure the actual depth of the trench opened by the row unit 200. Where a seed conveyor is used to convey seed from the seed meter 300 to the trench, the monitor 50 is preferably in data communication with conveyor drives 1410 configured to drive each seed conveyor.

Continuing to refer to FIG. 14, the monitor 50 is preferably in data communication with a communication module 1430 (e.g., a cellular modem, wireless receiver, or other component configured to place the monitor 50 in data communication with the Internet, indicated by reference numeral 1435, or another network or computer). Via the communication module 1430, the monitor 50 preferably receives data from and transmits data to a weather data server 1440, a soil data server 1445, and an agricultural recommendation server 1450. Via the communication module 1430, the monitor 50 preferably transmits measurement data (e.g., measurements described herein) to the recommendation server 1450 for storage and receives agronomic recommendations (e.g., planting recommendations such as planting depth, whether to plant, which fields to plant, which seed to plant, or which crop to plant) from a recommendation system stored on the recommendation server; in some embodiments, the recommendation system updates the planting recommendations based on the measurement data provided by the monitor 50.

Continuing to refer to FIG. 14, the monitor 50 is also preferably in data communication with one or more temperature sensors 960 mounted to the planter 10 and configured to generate a signal related to the temperature of soil being worked by the planter row units 200. The monitor 50 is preferably in data communication with one or more reflectivity sensors 950 mounted to the planter 10 and configured to generate a signal related to the reflectivity of soil being worked by the planter row units 200.

Referring to FIG. 14, the monitor 50 is preferably in data communication with one or more electrical conductivity sensors 970 mounted to the planter 10 and configured to generate a signal related to the temperature of soil being worked by the planter row units 200.

In some embodiments, each set of sensors 950, 960, 970 comprise a sensor array 900 associated with a single row unit 200; the sensor array 900 may be mounted to a seed firmer 500, described elsewhere herein.

In some embodiments, a subset of the sensors on the implement are in data communication with the monitor 50 via a bus 60 (e.g., a controller area network or "CAN" bus). In some embodiments, the sensors mounted to the seed firmer 400 and the reference sensor assembly 1800 are likewise in data communication with the monitor 50 via the bus 60. However, in the embodiment illustrated in FIG. 14, the sensor array 900 is in data communication with a wireless transmitter 62. The wireless transmitters 62 at each row unit are preferably in data communication with one or more wireless receivers 64 which are in turn in data communication with the monitor 50. The wireless receivers 64 may be mounted to the toolbar 14 or in the cab of the tractor 5.

Figure 3:
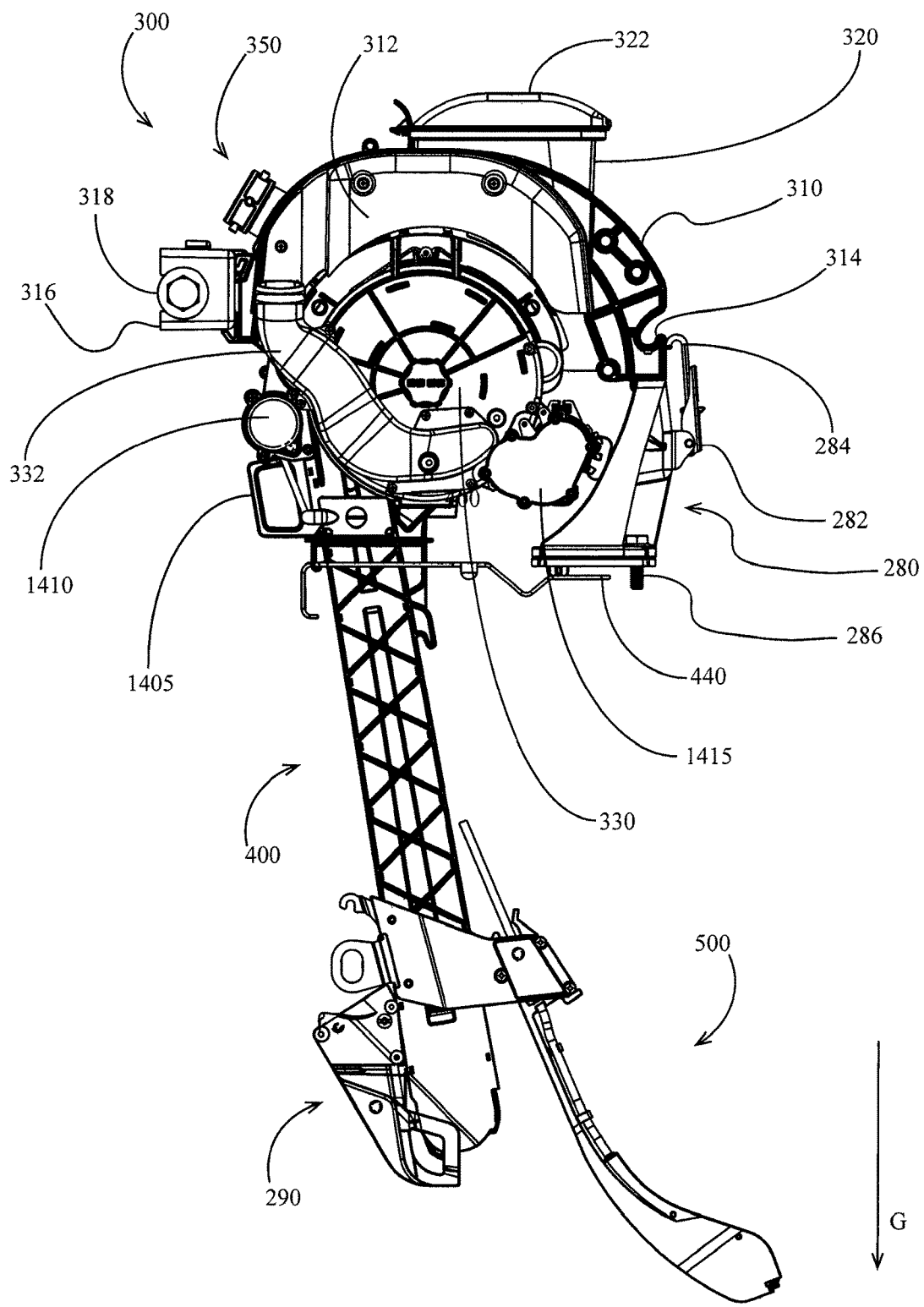
FIG. 3 is a left side elevation view of the seed meter and seed conveyor of another embodiment of a planter row unit.
Figure 4:
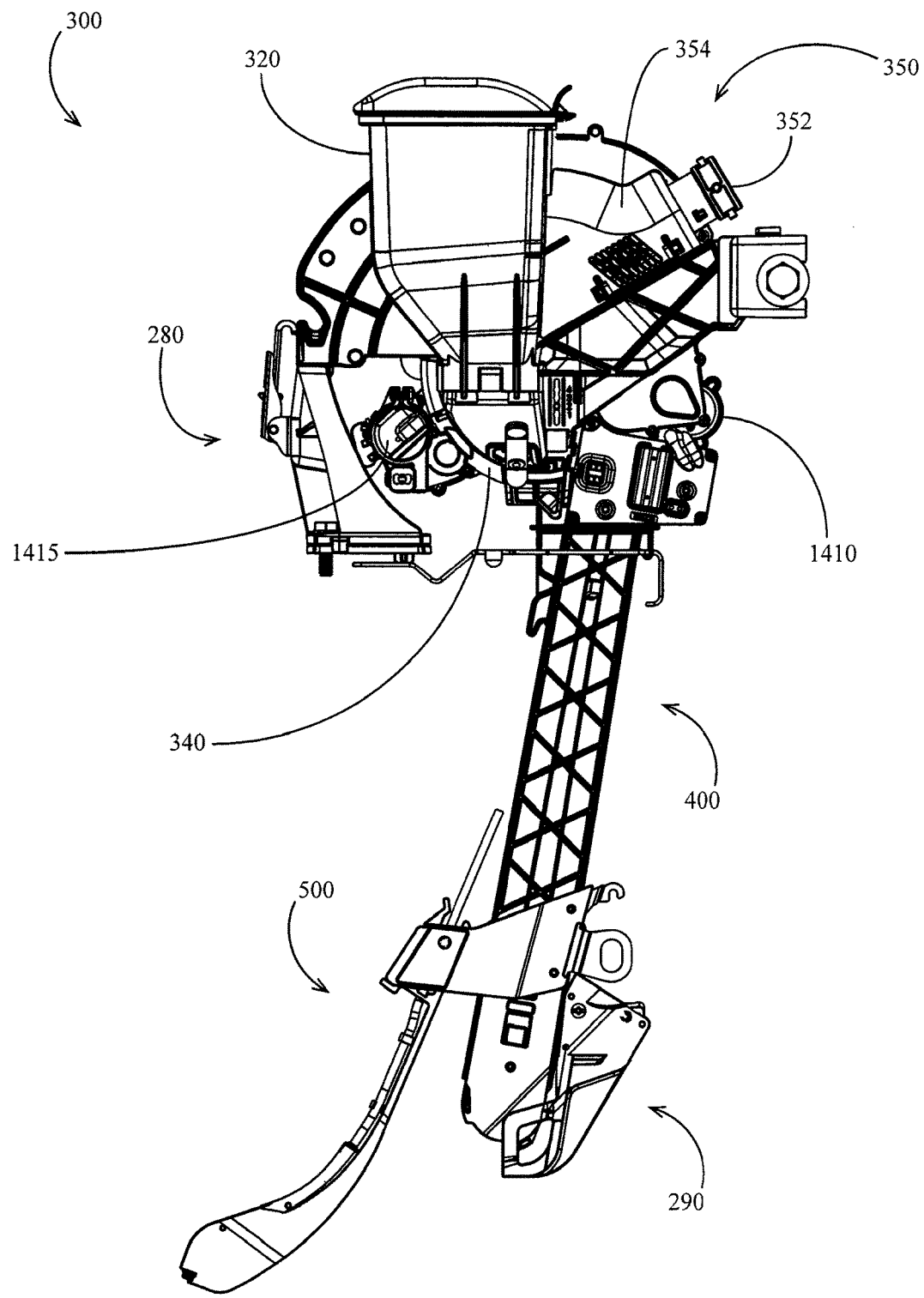
FIG. 4 is a right side elevation view of the planter row unit of FIG. 3.
Figure 5:
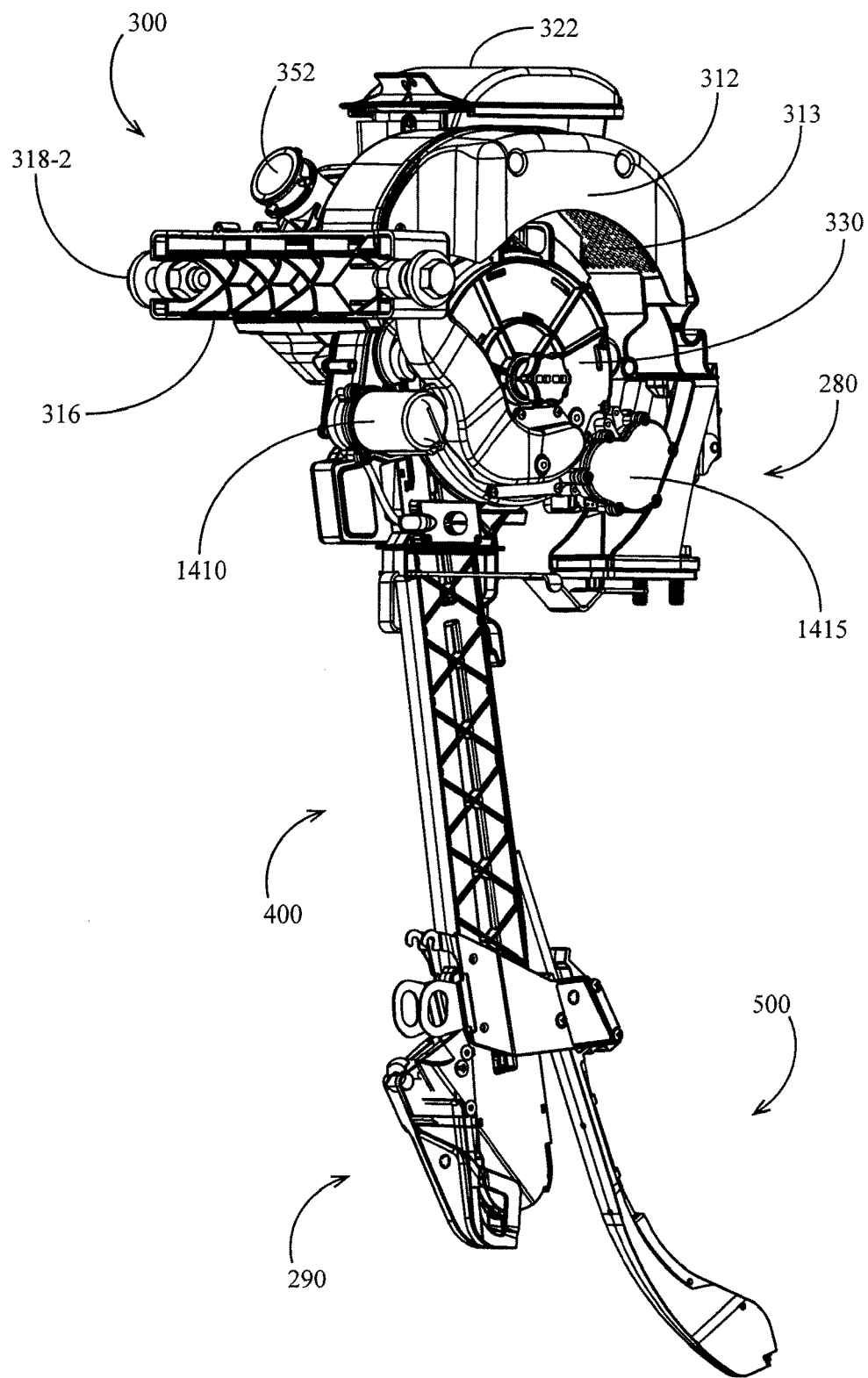
FIG. 5 is a perspective view of the seed meter and seed conveyor of the planter row unit of FIG. 3.

Turning to FIGS. 3-5, a portion an exemplary row unit 200 comprising a seed meter 300 and seed conveyor 400 is illustrated. In operation, the seed meter 300 receives seeds from a seed source, e.g., a hopper 320, and singulates the seed (i.e., deposits one seed at a time) into the seed conveyor 400. The seed conveyor 400 then conveys seed (preferably at a controlled rate directly related to the speed of the row unit 200) to the trench and deposits the seed with a rearward velocity relative to the row unit; the magnitude of the rearward velocity is preferably directly related to and/or approximately the same as the forward velocity of the row unit such that the released seed has a horizontal speed relative to the soil of zero or approximately zero. In some embodiments, a seed firmer 500 is disposed to firm seeds deposited into the trench; the seed firmer preferably also includes a liquid conduit for dispensing liquid near the deposited seed. In some embodiments, a boot 290 is mounted to a lower portion of the shank 254. The boot preferably includes transverse guards disposed to the left and right of a lower portion of the conveyor 400 to protect the seed conveyor 400 from contact with the opening discs 244. The transverse guards preferably include portions made of a hard material (e.g., tungsten carbide) facing the interior surfaces of the opening discs 244. The boot preferably includes a trench guard disposed below the lower portion of the conveyor 400 and configured to protect the conveyor 400 from contact with the trench. The trench guard preferably includes a portion or portions made of a hard material (e.g., tungsten carbide) facing the trench.

The seed conveyor 400 is preferably spring mounted to the row unit by a spring 440 which preferably biases the seed conveyor upward into engagement with the seed meter 300. The seed meter 300 is preferably pivotally mounted to pivots 318 in the row unit 00 by means of a brace 316. In an installation phase, the seed meter 300 is preferably tipped clockwise (on the view of FIG. 3) about the pivots 318 into engagement with the seed conveyor 400. Once the seed meter 300 is engaged with the seed conveyor 400, the user preferably engages a mounting portion 280 of the row unit to the seed meter 300; in the illustrated embodiment, the mounting portion includes a pivotal latch 282 which locks a hook 284 into engagement with a mounting aperture 314 in a frame 310 of the seed meter. The mounting portion 280 is preferably mounted to the frame of the row unit by a bolt 286 and in some embodiments also secures the spring 440 to the frame of the row unit.

Figure 7:
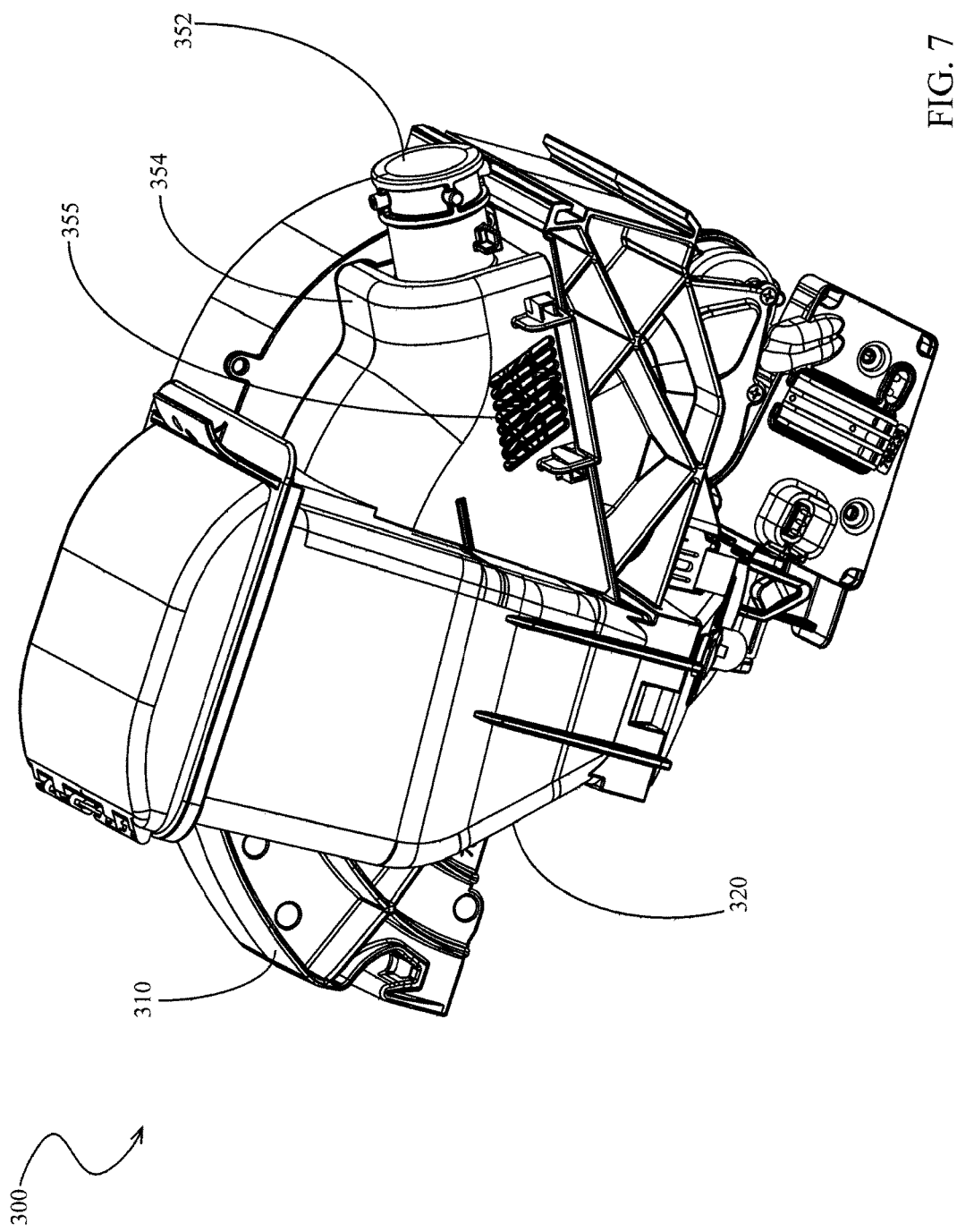
FIG. 7 is a perspective view of seed meter of the planter row unit of FIG. 3 showing a seed inlet.
Figure 8:
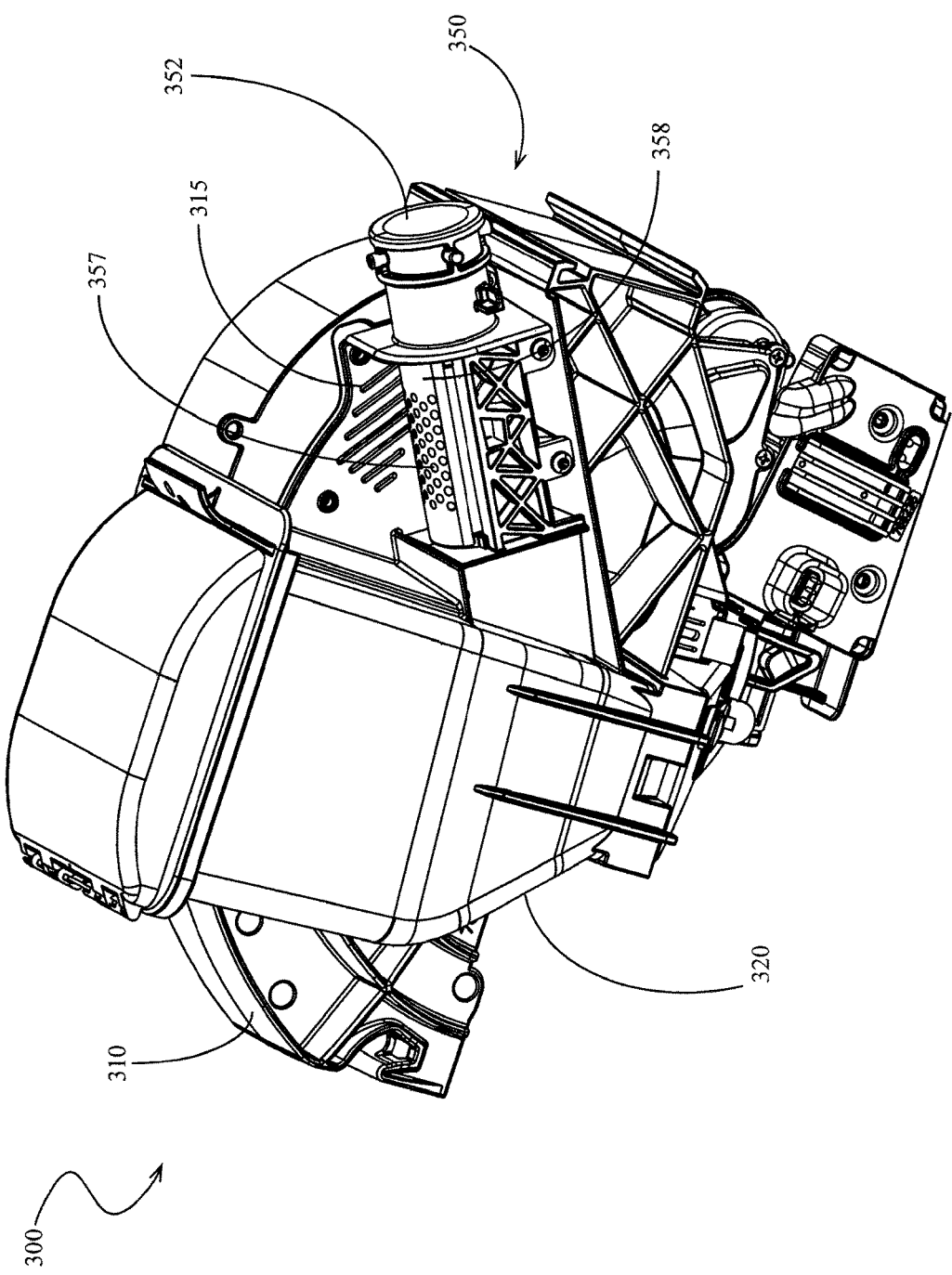
FIG. 8 is a perspective view of the seed meter of the planter row unit of FIG. 3 showing a seed inlet with a seed inlet housing removed.

The seed meter 300 preferably includes a vacuum side housing 330 releasably mounted to a seed side housing 340. The seed side housing 340 and vacuum side housing 330 are preferably releasably mounted to the frame 310, e.g., by engaging an arm 348 of the seed side housing to a deflectable mounting tab 318 fixed to the frame 310. The vacuum side housing 330 preferably includes a vacuum inlet 332 placing the interior of the vacuum side housing in fluid communication with a vacuum source (e.g., an impeller) which pulls a vacuum against a portion of a seed disc 370. The seed side housing preferably receives seed from the hopper 320 having a lid 322. In some embodiments, seed is communicated by air pressure to the hopper 320 from a bulk tank (e.g., mounted to the planter toolbar 14) via a seed inlet 350. Turning to FIGS. 7 and 8, seed enters the seed inlet 350 via an opening 352. The opening 352 is preferably releasably coupled to a seed supply hose (not shown) via a quick-connect structure permitting the user to twist a hose coupling to alternately release or lock the hose in fluid communication with the inlet 350. Seed and air entering the inlet 352 pass into the hopper 320 via an angled conduit 358 having a plurality of vent openings 357 extending partially along the length of the conduit. As the conduit 358 fills with seed, the vent openings 357 preferably become blocked by seed such that the airflow to the inlet 350 is slowed; once the conduit is filled with seed such that the vent openings 357 are blocked, all or substantially all flow of air and seed to the inlet 350 is preferably stopped. The conduit 358 is preferably protected from atmospheric rain, moisture and debris by a hood 354. Air escaping from the conduit 358 into the hood 354 preferably escapes to atmosphere via one or more vent openings (e.g., slats) 355 formed in the hood 354. Additionally, air escaping from the conduit 358 into the hood 354 preferably escapes via one or more vent openings (e.g., slates) 15 leading through the frame 310.

Figure 9:
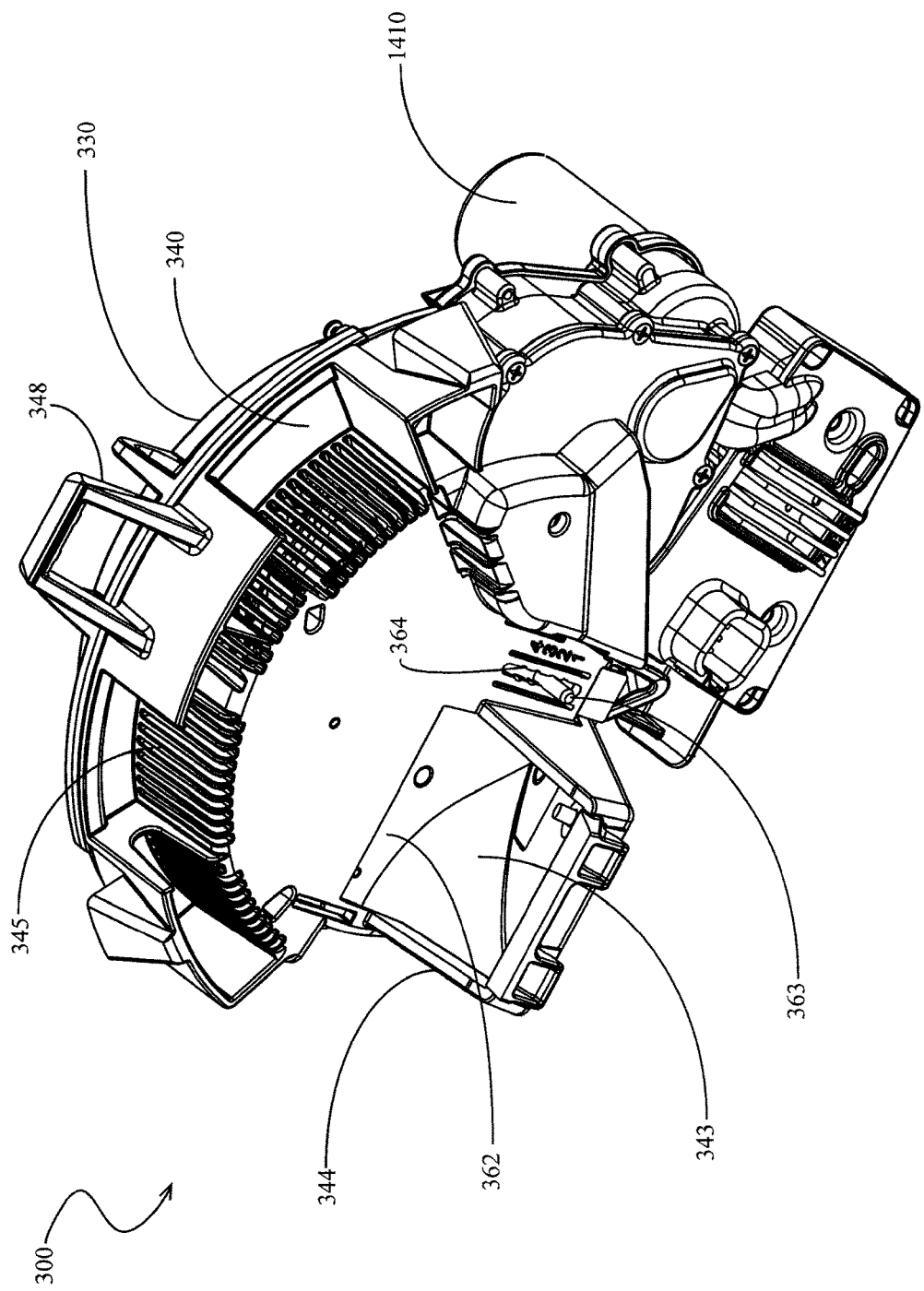
FIG. 9 is a perspective view of the seed meter of the planter row unit of FIG. 3 showing an adjustable baffle of the seed meter.
Figure 10:
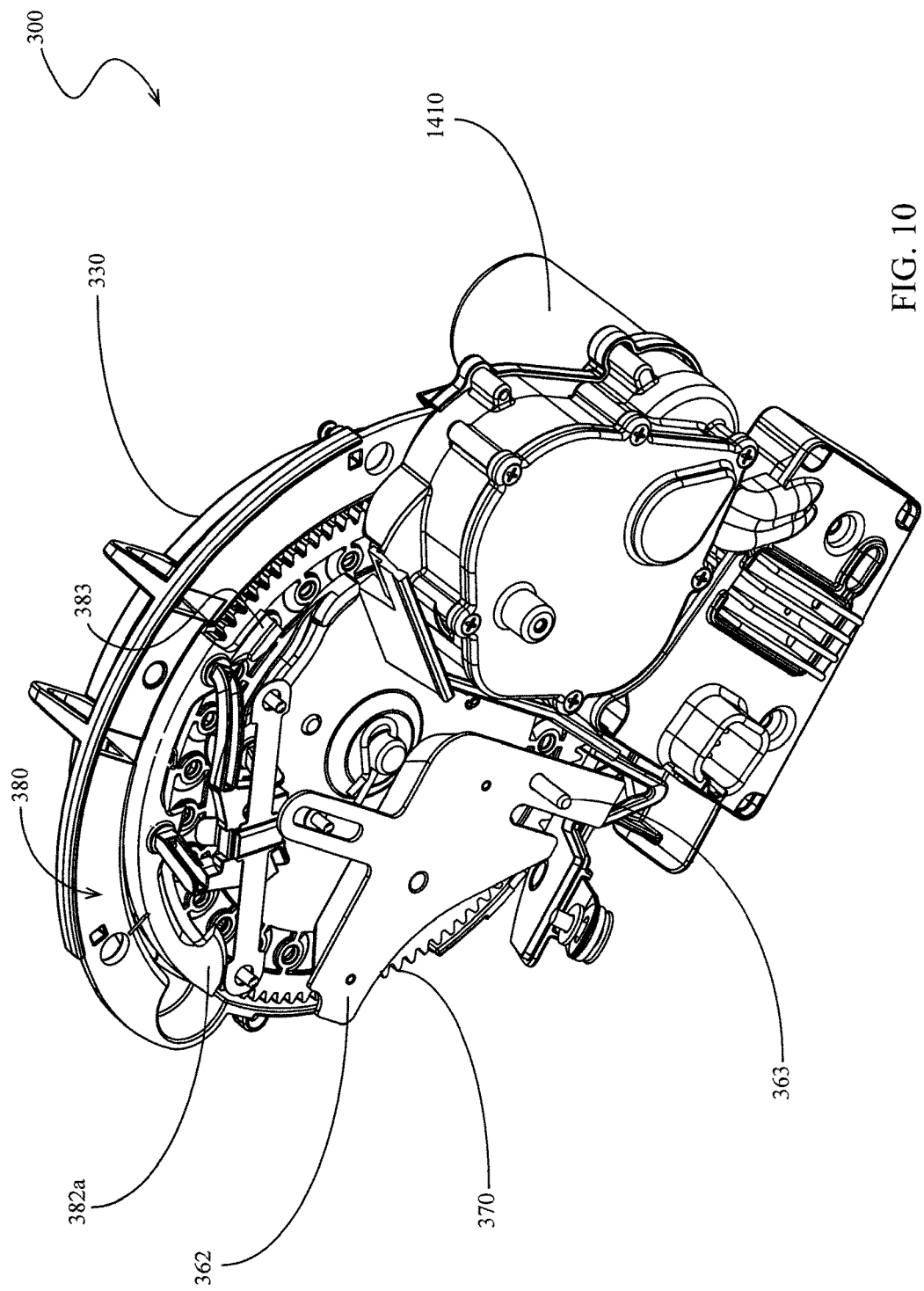
FIG. 10 is a perspective view of the seed meter of the planter row unit of FIG. 3 showing an adjustable baffle of the seed meter with a seed side housing of the seed meter removed.

Turning to FIGS. 9 and 10, seed collected in the hopper 320 preferably enters the seed side housing 340 of the seed meter 300 via a seed inlet 344. The size of seed inlet 344 is preferably set by the vertical position of a baffle 362. In the illustrated embodiment, the user is enabled to adjust the vertical position of baffle 362 by vertically adjusting the position of a peg 363 in a series of notches 364 formed in the seed side housing 340. Seed preferably flows by gravity into the seed side housing 340 along an angled surface 343. The angled surface 343 preferably guides seed to the bottom of the seed side housing such that a seed pool forms near the bottom of a seed disc 370 in the seed side housing. The meter drive 1415 preferably drives the seed disc 370 for clockwise rotation (on the view of FIG. 11) via an array of radially arranged gear teeth 375 formed in a circumferential edge of the seed disc 370 which cooperate with mating gear teeth (not shown) of the meter drive 1415. Vacuum is preferably imposed from the vacuum side housing on a portion of the seed disc 370 such that seed apertures 372 in the region extending clockwise (on the view of FIG. 11) from approximately 6 o'clock to approximately 3 o'clock such that seeds are entrained on an aperture 372 as it passes the seed pool at approximately 6 o'clock and released at approximately 3 o'clock.

Figure 6:
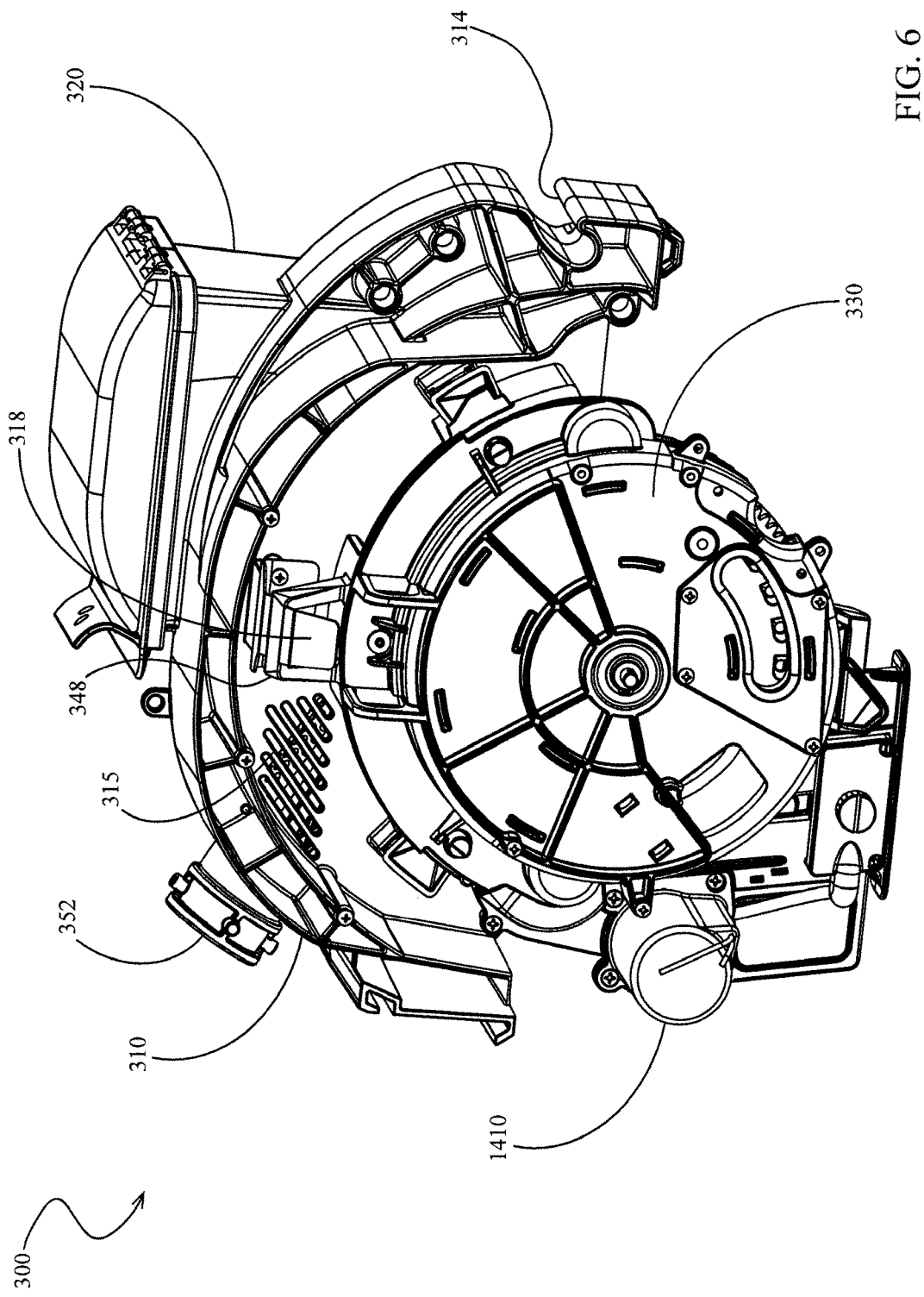
FIG. 6 is a perspective view of the seed meter of the planter row unit of FIG. 3 having a vent hood removed.

Referring to FIG. 9, it should be appreciated that imposing vacuum on the seed apertures 372 tends to pull air from the seed side housing 340 into the vacuum side housing 330. Thus a plurality of vents 345 are preferably provided in the seed side housing 340 such that atmospheric air enters the seed side housing 340. In the illustrated embodiment, the vents 345 comprise laterally extending slats radially arranged in an upper portion of the seed side housing 340. Turning to FIG. 9, the vents 345 are preferably in fluid-communication with the interior volume of a hood 312 having downward-facing vent openings 313. The vent openings 313 are preferably disposed vertically above the vacuum side housing 330 and preferably to the side of the vacuum side housing. In operation, air enters the vent openings 313 into the interior volume of the hood 312 and then enters the seed side housing 340 via the vents 345. The vent openings 313 preferably extend the longitudinal (i.e., travel-direction) length of the hood 312. The vent openings 313 preferably extend approximately the longitudinal (i.e., travel-direction) length of the seed side housing 340. The hood 312 preferably protects the vent openings 313 from atmospheric rain, moisture and debris. Referring to FIG. 6, the interior volume of the hood 354 preferably vents air to the interior volume of the hood 312 via vents 315. Thus a subset of air supplied by the bulk tank to the inlet 350 escapes the conduit 315 vents 357 and enters the interior volume of the hood 312 via the vents 315.

A singulator 380 is preferably disposed to remove all but one seed from each seed aperture 372. The singulator 380 is preferably supported by an axial spring permitting the singulator to float axially with axial movement of the seed disc 370 as disclosed in U.S. Pat. No. 7,699,009 ("the '009 patent"), the entirety of which is hereby incorporated herein by reference. The singulator 380 is preferably supported by a radial spring permitting the singulator to float radially with radial movement of the seed disc 370 as disclosed in the '009 patent. The singulator 380 is preferably disposed axially flush with the face of the seed disc 370. The singulator 380 preferably includes a plurality of outer lobes 382a, 382b, 382c disposed to partially pass over the seed apertures such that one or more seeds on a seed aperture 372 are contacted and moved radially inwardly as the seed aperture passes each lobe. The singulator 380 preferably includes a plurality of inner lobes 384a, 384b disposed to partially pass over the seed apertures such that one or more seeds on a seed aperture 372 are contacted and moved radially outwardly as the seed aperture passes each lobe. Each lobe 382, 384 preferably has an arcuate beveled surface adjacent to the seed apertures 372 such that seeds passing the lobe are gradually moved from a first radial position to a second radial position. The arcuate beveled surface of the lobes 382, 384 preferably lifts seeds slightly from the surface of the disc 370.

Figure 11:
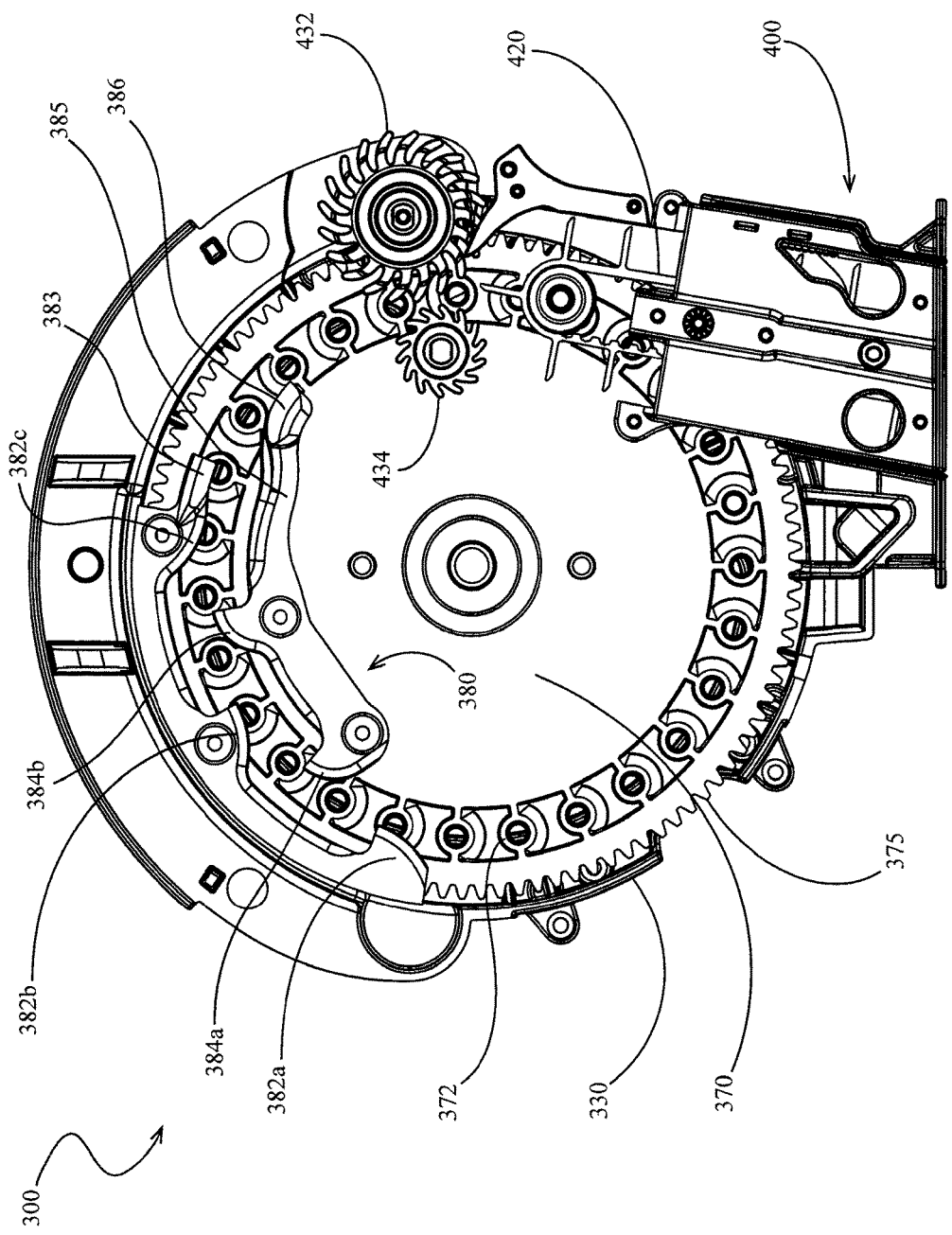
FIG. 11 is a side elevation view of the singulator and seed disc of FIG. 3.
Figure 12:
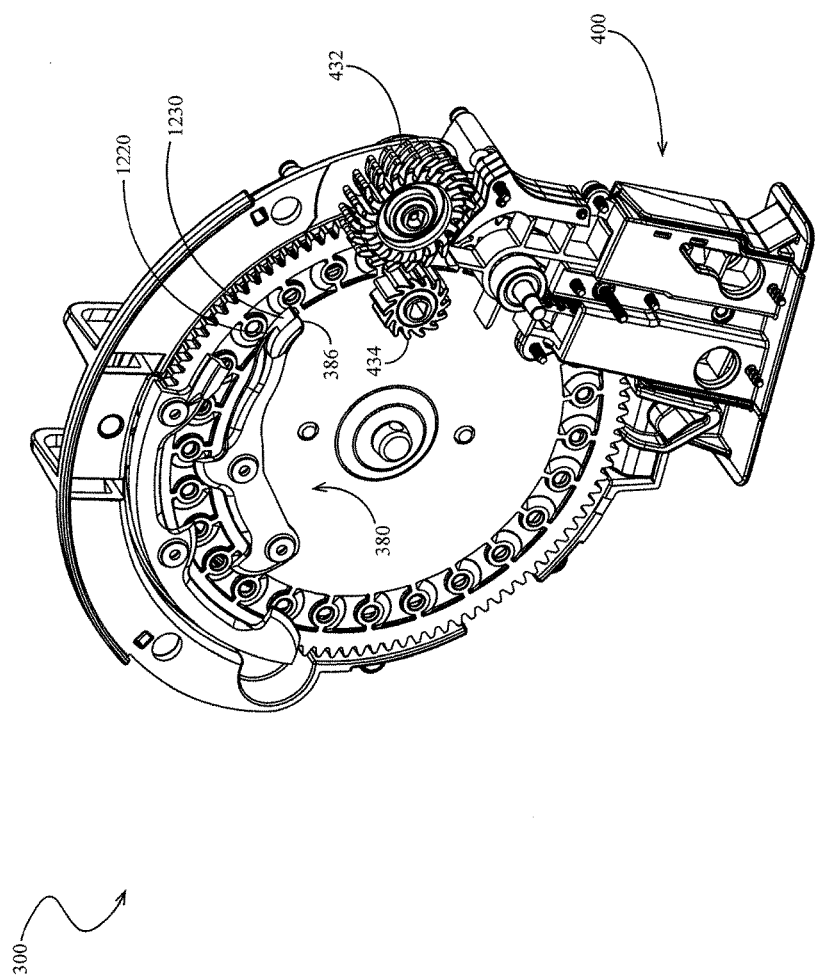
FIG. 12 is a downward perspective view of the singulator and seed disc of FIG. 3.
Figure 13:
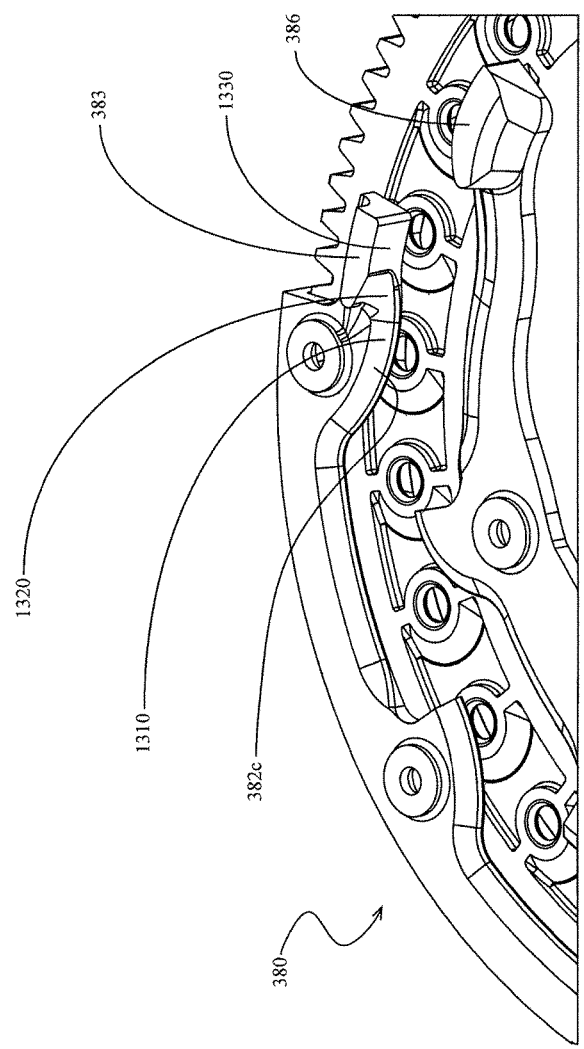
FIG. 13 is an upward perspective view of the singulator and seed disc of FIG. 3.

Referring to FIGS. 11-13, the seed meter 300 preferably additionally includes an outer seed orienting guide 383 and an inner seed orienting guide 386. In operation, the seed orienting guides 383, 386 preferably change the orientation of a seed about an axis tangential to the circular path of the seed on the seed disc (a "tangential axis"). The seed orienting guides 383, 386 are preferably configured to reorient the seed about a tangential axis without lifting the seed from the surface of the seed disc 370. In a preferred embodiment, the guides 383, 386 do not overlap the seed apertures 372; in other embodiments, the guide 383 slightly overlaps the seed apertures 372. In a preferred embodiment, the seed orienting guide 383 rotates the seed about a tangential axis in a first direction (e.g., counterclockwise along a view opposite the tangential velocity vector of the seed) and the seed orienting guide 386 rotates the seed about a tangential axis in a second direction (e.g., clockwise along a view opposite the tangential velocity vector of the seed).

In the illustrated embodiment, the guides 383, 386 are mounted to the singulator 380. The outer guide 383 is fixed to (e.g., formed as a part with) the outer lobe 382c. The inner guide 386 is fixed to the inner lobe 384b by an arm 385; the inner guide 386 is preferably angularly spaced clockwise (on the view of FIG. 11) from the outer guide 383 by an angular offset approximately the same as an angular offset between the inner lobe 384b and the outer lobe 382c. It should be appreciated that because the guides 383, 386 are fixed to the singulator 380, the guides are enabled to float with the singulator to retain a consistent radial and axial position relative to the seed path of the seed disc 370. In other embodiments, the guides 383, 386 may be mounted separately from the singulator 380.

Turning to FIG. 13, the guide 383 preferably includes a beveled surface 1320 having a seed disk angle relative to the surface of the seed disk 370. The seed disk angle preferably increases continuously in a clockwise direction such that seeds are reoriented by contact with the beveled surface 1320 as the seeds pass the guide 383 in the clockwise direction. A beveled surfaced 1310 is preferably disposed between the lobe 382c and the beveled surface 1320. The beveled surface 1310 preferably continuously guides the seed from contact with the lobe 382c to contact with the beveled surface 1320. The guide 383 preferably further includes an axial surface 1330 preferably disposed clockwise of the beveled surface 1320. The axial surface 1330 preferably extends clockwise along the seed path such that seeds passing the axial surface 1330 in a clockwise direction contact the axial surface 1330 and remain radially inward of the axial surface 1330. In some embodiments the axial surface 1330 is disposed at or radially outward from a radially outer end of the seed apertures; in other embodiments, the axial surface 1330 is disposed radially inward of the radially outer end of the seed apertures and radially outward of the center of the seed apertures.

Turning to FIG. 12, the guide 386 preferably includes a beveled surface 1220 having a seed disk angle relative to the surface of the seed disk 370. The seed disk angle preferably increases continuously in a clockwise direction such that seeds are reoriented by contact with the beveled surface 1220 as the seeds pass the guide 386 in the clockwise direction. The guide 386 preferably further includes an axial surface 1230 preferably disposed clockwise of the beveled surface 1220. The axial surface 1230 preferably extends clockwise along the seed path such that seeds passing the axial surface 1230 in a clockwise direction contact the axial surface 1230 and remain radially inward of the axial surface 1230. In some embodiments the axial surface 1230 is disposed at or radially inward from a radially inner end of the seed apertures; in other embodiments, the axial surface 1230 is disposed radially outward of the radially inner end of the seed apertures and radially inward of the center of the seed apertures.

In operation, after a seed has been reoriented by the guides 383, 386, the seed preferably continues to travel clockwise (on the view of FIG. 11) toward the seed conveyor 400. The seed is preferably grasped between two rotating loading wheels 432, 434 at or near the location of vacuum release from the loading seed disc 370. After being reoriented by the guides 383, 386, the seed is preferably oriented for improved introduction into the gap between the loading wheels 432, 434 in comparison to the original orientation of the seed. For example, in the case of flat seeds, the guides 383, 386 preferably orient the seed such that the seed is grasped about its smallest width by the loading wheels; e.g., with the longest width of the seed perpendicular to the seed disc 370. The seed is then preferably propelled by the loading wheels 432, 434 toward the belt 420 of the seed conveyor 400. The belt 420 then conveys the seed downward to the trench.

Transport Seed Flap Embodiments

Figure 15:
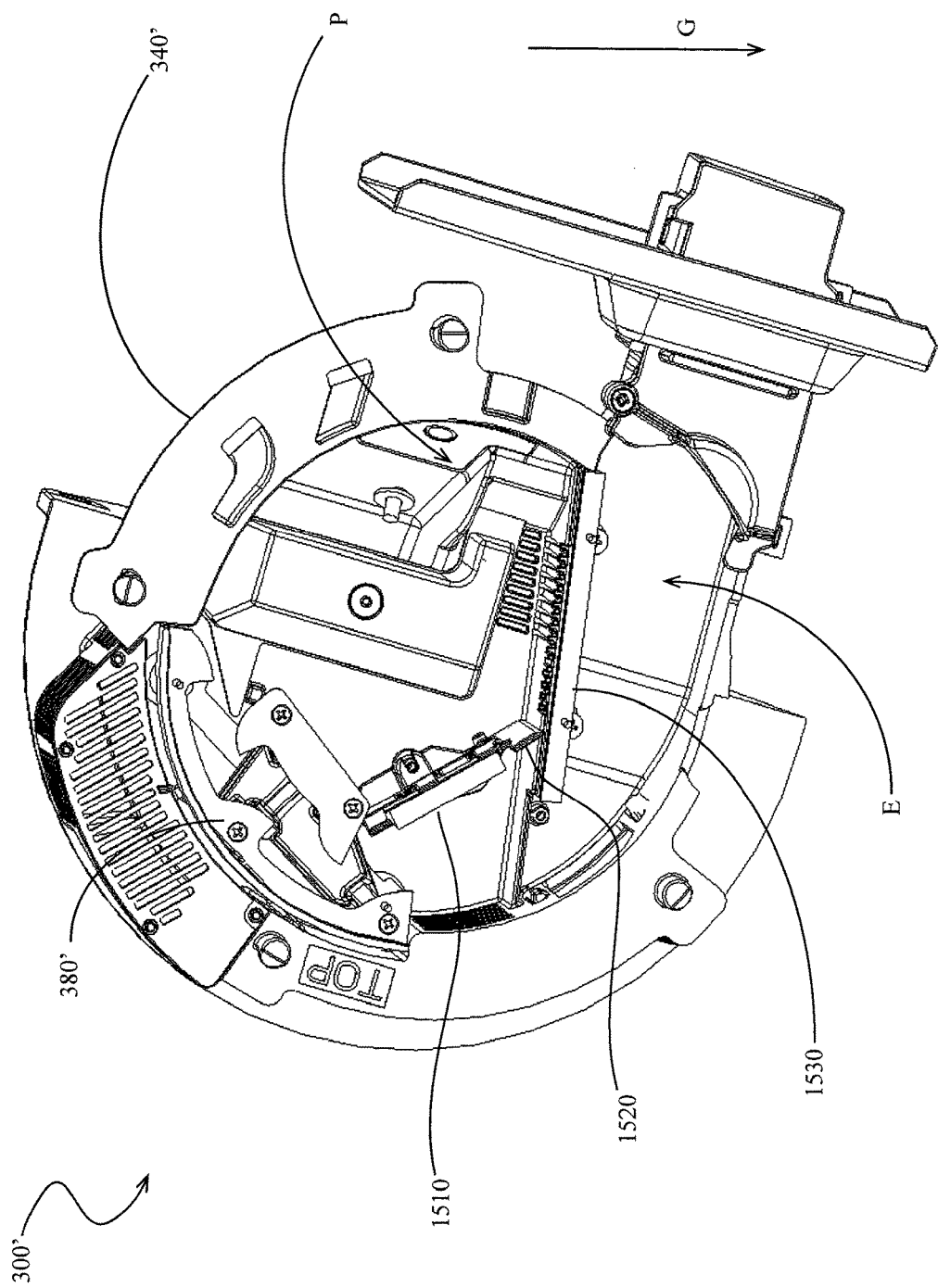
FIG. 15 illustrates an embodiment of a seed meter including a pivotal flap.

Turning to FIG. 15, an alternative seed meter 300' is illustrated. The alternative seed meter 300' is preferably generally similar to the seed meter 300 except as described herein. The seed meter 300' preferably includes a generally vertical brush 1530 and an upper angled brush 1510. A flap 1520 is preferably pivotally connected a lower end of the upper angled brush 1510, preferably about a hinge. In the orientation of FIG. 15, the meter is disposed at an angle relative to the direction of gravity G such that the flap 1520 falls into a first position in contact with the vertical brush 1530. Thus in the orientation of FIG. 15, the brush 1510, the flap 1520 and the brush 1530 preferably cooperate with the seed disc (not shown in FIG. 15) to retain seeds in the seed pool area of the seed side housing 340'. Further, in the orientation of FIG. 15, the flap 1520 and the brushes 1510, 1530 preferably cooperate to prevent the seeds from entering an exit chute area E of the seed side housing (or, in seed meter embodiments in engagement with a seed conveyor, from contacting or being introduced into the seed conveyor). It should be appreciated that in planter embodiments in which the row unit 200 is tipped about a horizontal axis for transport, the seed meter 300' may transition to the angled orientation of FIG. 15 when the row unit is in the transport position. When the row unit 200 is rotated back into the working position, the seed meter 300' is returned to the working orientation as shown in FIG. 3 and the flap 1520 preferably rotates under the influence of gravity to a second position in which the flap is generally parallel to the direction of gravity G. In the second position, the flap preferably allows seeds to fall vertically from an upper portion of the meter (e.g., after being removed from the seed disc by the singulator 380') and pass between the brushes 1510, 1530 and back into the seed pool area P of the seed side housing 340'.

The foregoing description is presented to enable one of ordinary skill in the art to make and use the invention and is provided in the context of a patent application and its requirements. Various modifications to the preferred embodiment of the apparatus, and the general principles and features of the system and methods described herein will be readily apparent to those of skill in the art. Thus, the present invention is not to be limited to the embodiments of the apparatus, system and methods described above and illustrated in the drawing figures, but is to be accorded the widest scope consistent with the spirit and scope of the appended claims.

The invention claimed is:

1. A seed meter, comprising:
   a seed disc rotatable in a direction of rotation, said seed disc having a plurality of seed apertures, said plurality of seed apertures defining a circular path as said seed disc rotates in said direction of travel, each of said plurality of seed apertures having a central axis, each of said plurality of seed apertures entraining seeds from a seed source as said seed disc rotates in said direction of rotation; and
   a singulator disposed along said circular path, said singulator having a plurality of outer lobes and a first orientation lobe, said first orientation lobe located downstream of said outer lobes along said circular path and disposed to change an orientation of said entrained seeds as said entrained seeds rotate past said first orientation lobe along said circular path.

2. The seed meter of claim 1, wherein said first orientation lobe contacts said entrained seeds changing said orientation of said entrained seeds along a first direction about said central axis.

3. The seed meter of claim 1, wherein said change of orientation of said entrained seeds is about said central axis.

4. The seed meter of claim 1, wherein said first orientation lobe includes an orienting surface.

5. The seed meter of claim 4, wherein said orienting surface is disposed tangentially adjacent to said circular path.

6. The seed meter of claim 4, wherein said orienting surface is disposed adjacent to said circular path.

7. The seed meter of claim 4, wherein said orienting surface is normal to said seed disc.

8. The seed meter of claim 4, further comprising:
   a beveled surface adjacent to said circular path, wherein said beveled surface is disposed upstream of said circular path from said first orientation lobe.

9. The seed meter of claim 4, further comprising:
   a beveled surface adjacent to said circular path, wherein said beveled surface is disposed upstream of said circular path from said orienting surface.

10. The seed meter of claim 9, wherein said beveled surface has a seed disc angle relative to said seed disc, and wherein said seed disk angle increases continuously along said circular path.

11. The seed meter of claim 9, wherein said beveled surface reorients said entrained seeds about a tangential axis, said tangential axis being tangential to said circular path.

12. The seed meter of claim 11, further comprising:
   a second orientation lobe disposed along said circular path, said second orientation lobe disposed to change said orientation of said entrained seeds as said entrained seeds rotate past said second orientation lobe along said circular path.

13. The seed meter of claim 12, wherein said second orientation lobe contacts said entrained seeds changing said orientation of said entrained seeds along a second direction about said central axis.

14. The seed meter of claim 12, wherein said second orientation lobe is located downstream of said first orientation lobe along said circular path.

15. The seed meter of claim 9, further comprising:
a seed conveyor, said seed conveyor receiving said entrained seeds from said seed disc, said seed conveyor conveying seeds at a controlled rate to a planting trench below said seed meter.

16. The seed meter of claim 1, further comprising:
a seed conveyor, said seed conveyor receiving said entrained seeds from said seed disc, said seed conveyor conveying seeds at a controlled rate to a planting trench below said seed meter.

17. A seed meter, comprising:
a seed disc rotatable in a direction of rotation, said seed disc having a plurality of seed apertures, said plurality of seed apertures defining a circular path as said seed disc rotates in said direction of travel, said seed disc capturing seeds from a seed source on each of said plurality of seed apertures;
a singulator disposed adjacent said circular path, said singulator comprising:
a plurality of outer lobes;
a first orientation lobe located downstream of said plurality of outer lobes along said circular path, said plurality of outer lobes disposed to remove seeds in excess of one captured on any one of said plurality of seed apertures such that each of said plurality of seed apertures retains one captured seed; and
a second orientation lobe disposed to contact said one captured seed on each of said plurality of seed apertures rotating past said second orientation lobe along said circular path.

18. The seed meter of claim 17, wherein said second lobe is configured to move said one captured seed from a first orientation to a second orientation.

19. The seed meter of claim 18, wherein in said second orientation a width of said one captured seed is narrower than in said first orientation.

20. The seed meter of claim 17, further comprising:
a seed conveyor, said seed conveyor receiving said remaining seed from said seed disc, said seed conveyor comprising:
a conveyor belt disposed to convey seeds from said seed disc; and
a first loading wheel and a second loading wheel configured to grasp said one captured seed from each of said plurality of seed apertures and direct said grasped seed toward said conveyor belt, said first loading wheel rotating about a first axis, said second loading wheel rotating about a second axis with a gap between said first and second loading wheels, said gap having a width along a gap axis, said gap axis being normal to said first axis and said second axis, said gap axis intersecting said first axis and said second axis.

* * * * *